United States Patent [19]

Jacobson et al.

[11] Patent Number: 4,650,266
[45] Date of Patent: Mar. 17, 1987

[54] ROTARY HIGH POWER TRANSFER APPARATUS

[75] Inventors: Peter E. Jacobson; Ryan S. Porter, both of Phoenix, Ariz.

[73] Assignee: Sperry Corporation, New York, N.Y.

[21] Appl. No.: 751,757

[22] Filed: Jul. 3, 1985

[51] Int. Cl.⁴ .......................................... H01R 39/34
[52] U.S. Cl. ................................. 339/5 R; 339/64 R
[58] Field of Search .......... 339/5 R, 5 M, 8 R, 8 PB, 339/64 R, 92 R

[56] References Cited

U.S. PATENT DOCUMENTS

| | | | |
|---|---|---|---|
| 3,964,814 | 6/1976 | Kalbitz et al. | 339/64 R |
| 4,068,909 | 1/1978 | Jacobson et al. | 339/5 R |
| 4,098,546 | 7/1978 | Swartz et al. | 339/5 R |
| 4,372,633 | 2/1983 | Allen et al. | 339/5 M |

Primary Examiner—Eugene F. Desmond
Attorney, Agent, or Firm—Howard P. Terry

[57] ABSTRACT

An apparatus for reducing terminal-to-terminal circuit resistance and enhancing heat transfer in a rotary power transfer apparatus of the roll ring type comprising a connecting thimble for attaching an external power cable to a cone shaped terminal which is attached to a tab integral to an outer ring. An inner ring having a spherical recess mates with the spherical end of a tie connector. A cone shaped terminal is fitted to a second connecting thimble for attaching a second external power cable.

2 Claims, 4 Drawing Figures

ROTARY HIGH POWER TRANSFER APPARATUS

The invention described herein was made in the performance of work under NASA Contract No. NAS-3-24264 and is subject to provisions of Section 305 of the National Aeronautics and Space Act of 1958 (72 Stat. 435; 42 U.S.C. 2457).

BACKGROUND OF THE INVENTION

1. Field of the Invention

This invention relates to rotary power transfer devices and more particularly to providing improvements related to increased transfer efficiency with reduced operating temperature and greater utilization of external interface connections.

2. Description of the Prior Art

One means of transferring electrical power across a rotating interface, even in a vacuum, is provided by the roll ring, a concept described in U.S. Pat. No. 4,098,546, issued July 4, 1978 to Schwartz et al and U.S. Pat. No. 4,372,633 issued Feb. 8, 1983 to Allen et al. Both foregoing patents are assigned to the assignee of the present invention. U.S. Pat. No. 4,098,546 describes the basic roll ring concept of conducting electrical signals and power across the rotating interface by means of a flexible hoop (flexure) captured in shallow grooves in two circular rings. U.S. Pat. No. 4,372,633 describes a roll ring configuration which utilizes a set of multiple flexures between the two rings, a set of idlers to separate the flexures and a set of guides to pilot the idlers, thereby providing multiple paths through the assembly and an increase in current carrying capacity.

There is no known alternate means of transferring large currents at high voltage levels across a rotary interface with the transfer efficiency provided by the roll ring configuration of U.S. Pat. No. 4,372,633. The roll ring configuration, however, presents design and application problems relating to heat transfer, terminal-to-terminal electrical resistance and connection to external power cables.

The present invention addresses the problem of reducing terminal-to-terminal resistance and improving heat transfer from the interior to the exterior of the roll ring module. Materials of high dielectric strength needed to electrically insulate high current and voltage carrying components are also generally poor heat conductors. If the terminal-to-terminal resistance can be reduced, the transfer efficiency is increased resulting in less power being converted into heat. Every interconnection represents a resistance in the series chain between the external terminations in a given circuit. Part-to-part manufacturing tolerances also contribute to this variation of resistance. The external terminations themselves add to the total resistance and also introduce a variableness to the total resistance which may vary each time a connection is made.

Additionally, the power cables used to make connections to the various terminals for various applications are stiff and not only introduce variations in connection resistance, but require adequate working space for the connections. Terminals which face in a given axial direction for one application are not necessarily optimum for other applications.

SUMMARY OF THE INVENTION

The present invention is an apparatus for providing reduced terminal-to-terminal transfer resistance and improved heat transfer in a high power rotary roll ring module. A connecting thimble accepts a stiff power cable at one end. The opposite end of the connecting thimble contains a recess in the shape of a tapered cone for accepting a tapered cone terminal connected to an outer ring tab of the roll ring module. The tapered cone terminal is reinforced with a stiffening bolt and secured to the connecting thimble by a threaded thimble lock nut. Heat transfer is enhanced by positioning a wavy spring between the outer circumference of the outer ring and the inter circumference of an electrical insulator in contact with the outer housing of the roll ring module. A shim whose thickness is chosen to optimize heat transfer between the outer ring and the housing is positioned between the wavy spring and the electrical insulator. An inner ring, having a spherical recessed cup accepts power transferred from the outer ring through a flexure. The recessed spherical cup accepts the spherical end portion of a tie connector. The opposite end of the tie connector is configured as a tapered cone for insertion into the tapered cone recess of the connecting thimble to which is attached a connecting cable.

DESCRIPTION OF THE PREFERRED EMBODIMENT

The present invention is generally useful in applications requiring transfer of large amounts of power across a rotary junction and in particular is useful in satellite and spacecraft applications utilizing the roll ring configuration disclosed in U.S. Pat. No. 4,372,633 which is incorporated herein by reference.

Figure 1:
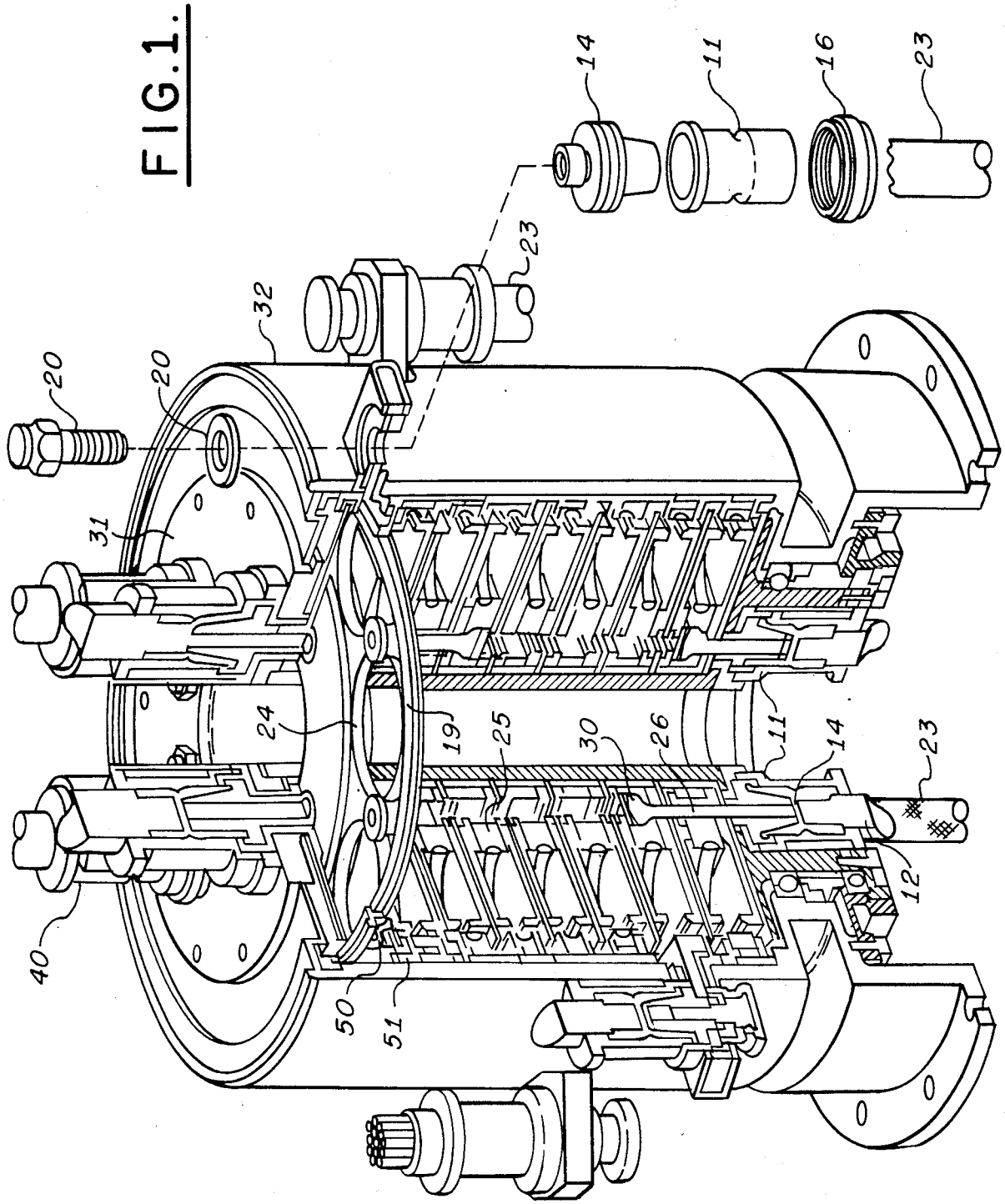
FIG. 1 is a partial sectional view of an eight-circuit roll ring power transfer apparatus.
Figure 2:
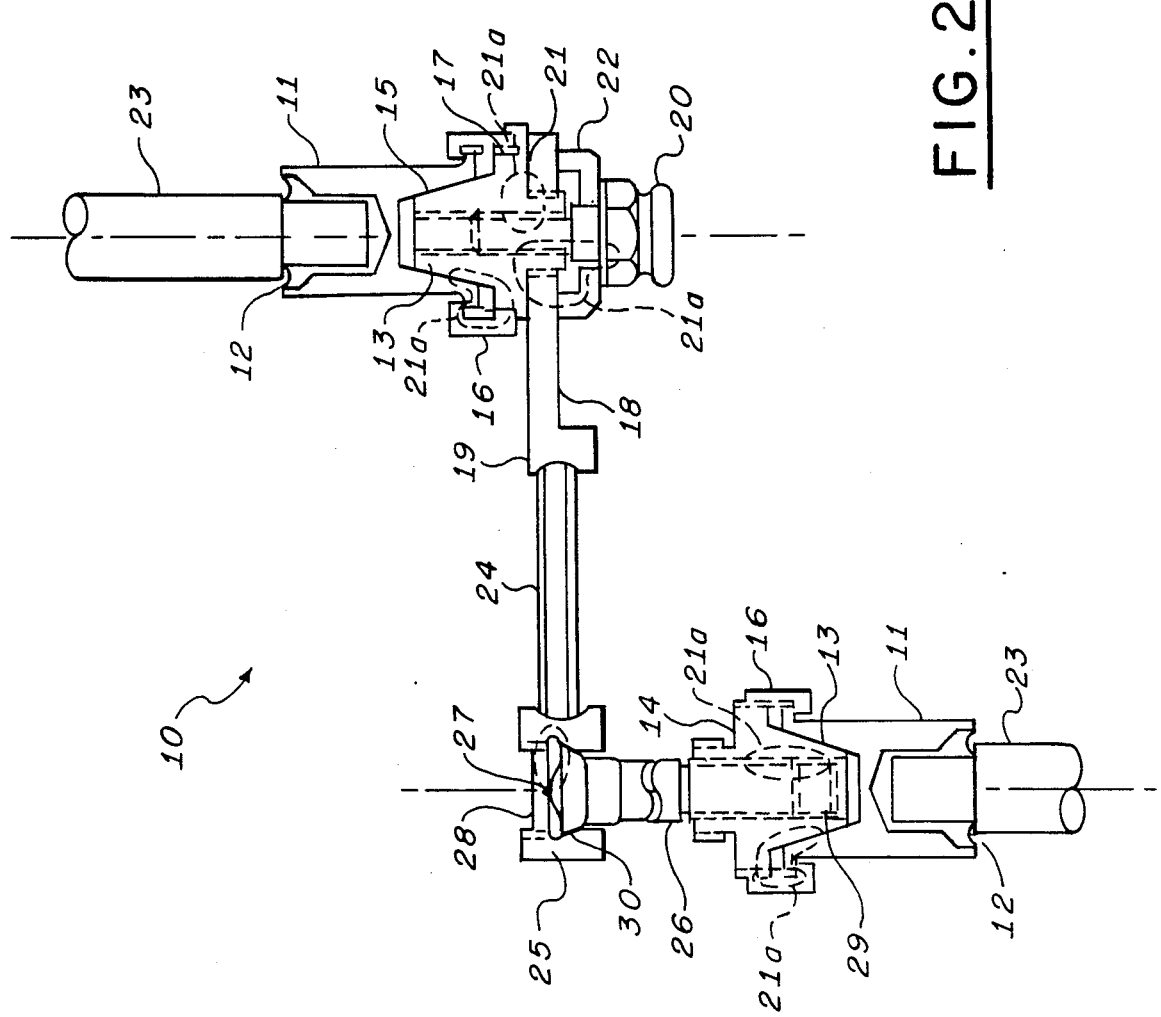
FIG. 2 illustrates the terminal-to-terminal circuit path of the present invention.

Referring to FIGS. 1 and 2, the structure of the invention will now be described. Increased transfer efficiency is provided by reducing terminal-to-terminal circuit resistance. FIG. 2 illustrates a terminal-to-terminal circuit 10. The connecting thimble 11 is attached to cable 23 by means of the conventional solder pot 12 in one end of thimble 11. Thimble 11 also contains a tapered cone 13 which engages the terminal cone 14 at interface 15 and is held securely in place with the thimble lock 16 by means of the thread interface 17. The terminal cone 14 is firmly engaged with the intergral ring tab 18 which is an integral part of outer ring 19. Stiffening bolt 20 assures a positive contact between terminal cone 14 and ring tab interface 21 by means of the backing ring 22. Stiffening bolt 20 and backing ring 22 assure full contact even when external cable 23 induces mechanical load strains on the external connection tending to bend and twist integral ring tab 18. The foregoing type of loading is a common source of resistance change on more conventional existing connecting means such as spring-loaded pins and plugs and bolted connections used on spade lugs commonly used on power cables.

Outer ring 19 transfers current through flexures 24 (as shown in FIG. 1 and described in U.S. Pat. No. 4,372,633, the typical roll ring configuration has multiple flexure circuits to increase current carrying capacity). Connection at inner ring 25 to terminal cone 14 is made by tie connection 26. Tie connection 26 has a spherical interface 30 which engages with a like interface in inner ring 25. The center of radius of the spherical interface 30 is located at the connection pilot 27 which is at the outer extremety of tie connection 26. Lock nut 28 engages the tie connection 26 radius center at pilot 27 thereby avoiding any movement within the spherical interface 30 when the locknut 28 clamps the connection 26. Lock nut 28 is not secured until terminal cone 14 on inner ring 25 is secured into position in the rest of the assembly. This assures that no mechanical strain is developed in any of the current transfer components which could change after the unit is in service resulting in a changed interface resistance. In addition, the self-aligning feature of the spherical interface 30 eliminates the possible effects of manufacturing and assembly variations. A terminal lockscrew 29 is used to secure terminal cone 14 to connection 26 in a manner similar to locknut 28 engagement in ring 25 against connection 26. This preloading arrangement insures that temperature excursions and mechanical loading of circuit components after the module is placed in service do not result in resistance changes at any of these interfaces since the preload loops are short. Preload loops 21a are illustrated as dashed lines in FIG. 2.

Enhanced heat transfer away from the circuit conducting components is provided as follows. All of the power loss from input to output of the module 40 in FIG. 1 is transformed to heat. This heat is predominantly transferred into the inner ring 25 and the outer ring 19. The inner housing 31 and the outer housing 32, respectively, are the heat sinks to which it is desired to transfer the heat for eventual transfer to the spacecraft or other collecting point.

Figure 3:
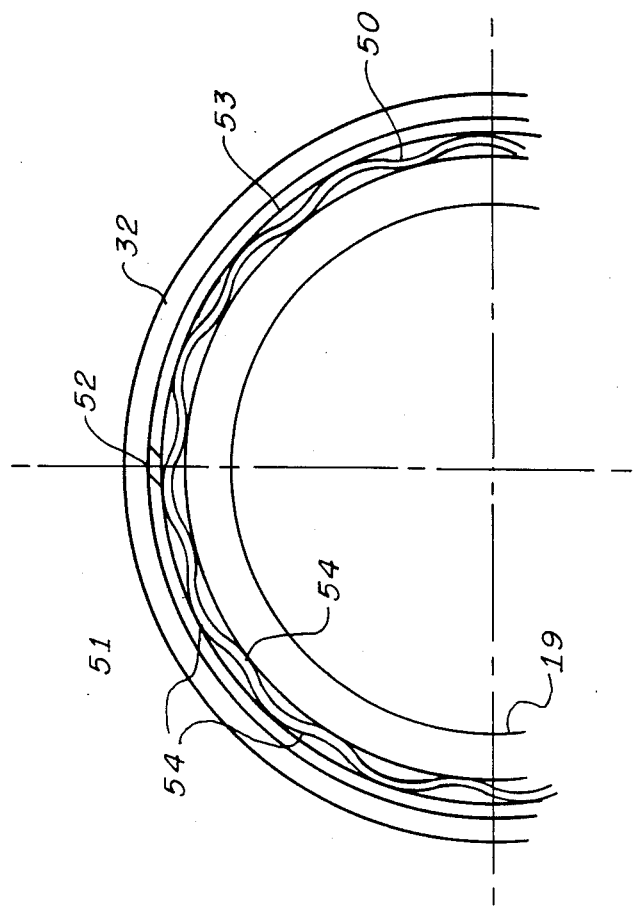
FIG. 3 illustrates, in cross section, the assembly for improving heat transfer.

FIG. 3 shows the preferred embodiment means for transferring heat by conduction from outer ring 18 to the outer housing 32. A similar arrangement conducts heat from inner ring 25 to inner housing 31. A wavy spring 50 is inserted in a circumferential slot between the outer ring 19 and insulator 51. Insulator 51 is provided with a gap 52 which allows the walls of insulator 51 to be forced into intimate contact with the wall of housing 32 by the action of wavy spring 50. Various thickness optimizing shims 53 may be inserted between the spring 50 and the housing 32 until maximum heat conduction through contact points 54 is achieved. Shim 53 thickness which results in minimum temperature differential between ring 19 and housing 32 for a given heat source at ring 19 is that thickness which provides optimum heat transfer efficiency.

Figure 4:
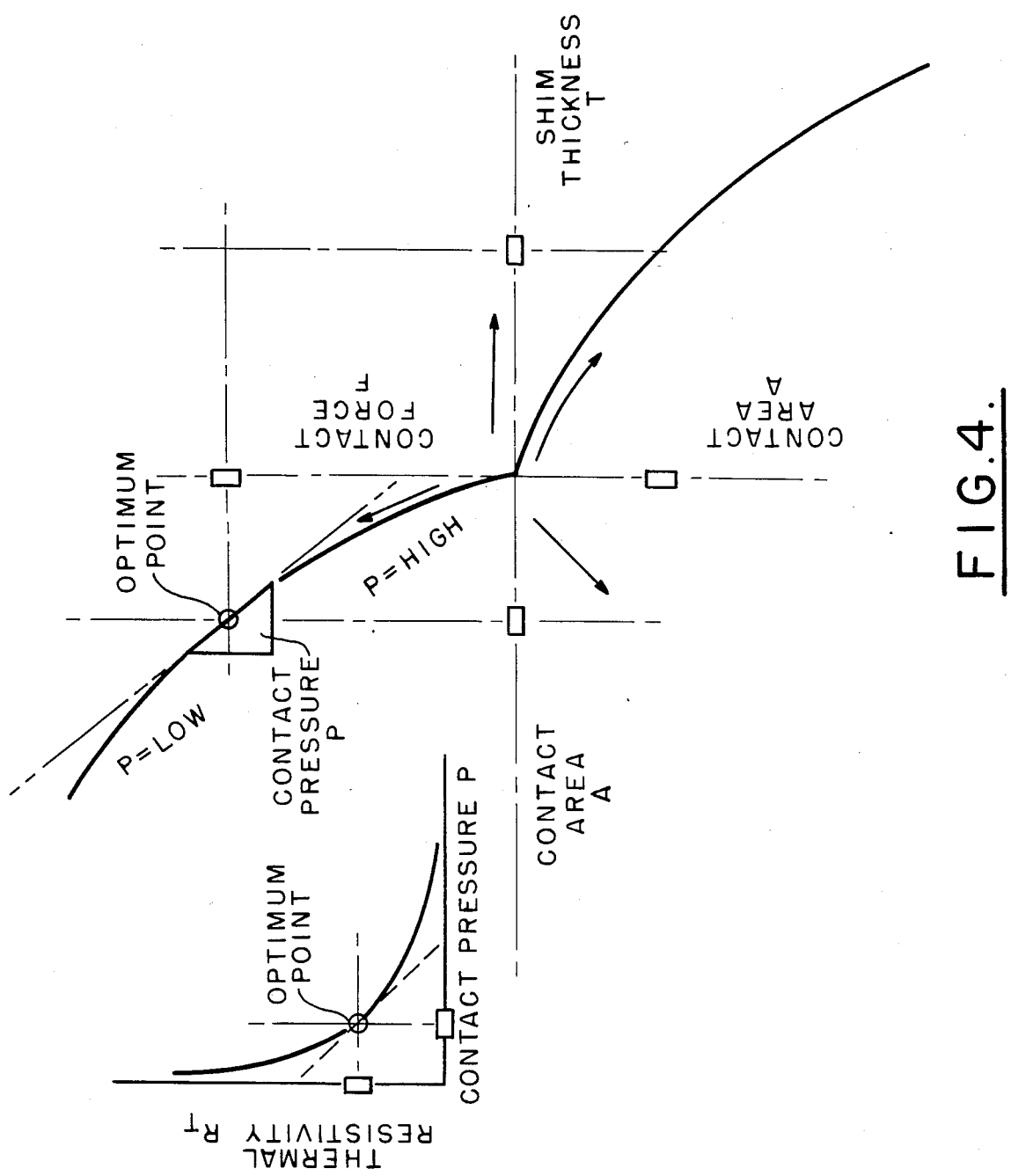
FIG. 4 is a plot for optimizing heat transfer.

Obtaining optimum heat transfer efficiency is illustrated in FIG. 4. The thermal transfer between two clamped members is related to the effective thermal resistivity at the interface. FIG. 4 shows the qualitative relationship between thermal resistivity or $R_T$ and the clamping pressure P. Unfortunately, the quantitative relationship for even common materials is rarely available. For a given design, therefore, using specific materials, the heat transfer characteristics must be determined empirically. Data is collected relative to the steady state temperature differential between outer ring 19 and housing 32 for various shim 53 thicknesses, T. Referring again to FIG. 4, as shim 53 thickness is varied. the deflection of wavy spring 50 is changed and the normal contact force F at the insulator 51 and the housing 32 inner wall is also changed as shown in the plot. In addition, contact area A of wavy spring 50 at outer ring 32 and at insulator 51 is also effected by the various shim 53 thicknesses. Since both normal force F and area A are being influenced but not equally, the ratio of the two, normal pressure P, is also changing with shim 53 thickness. The heat transfer is effected by the thermal resistivity $R_T$ and the area of contact A. Starting at the optimum point shown in FIG. 4, as shim 53 thickness T increases, contact force F and contact area A increase, contact pressure P decreases and resistivity $R_T$ increases. Since resistivity is increasing faster than is area A, the heat transfer Q decreases. Conversely, as shim 53 thickness T decreases, contact force F and contact area A decreases, contact pressure P increases and resistivity $R_T$ decreases. Since area A is decreasing faster than is the resistivity, the heat transfer Q decreases. Thus, it can be seen that an optimum heat transfer can be effected by selecting a particular shim 53 thickness. In the preferred embodiment of the invention, optimum shim 53 thickness was found to be 0.040 inches.

Universal utilization of the external terminal interfaces is also provided. FIG. 1 shows the spiral configuration of the terminals on outer housing 32 to which cables 23 are attached. FIG. 1 also shows the advantage provided by the axial reversibility of the terminals. These terminals may be reversed, even in the field, by removing and reassembling stiffening bolt 20, backing ring 22 and terminal cone 14 on any selected circuit connection. Thimble lock 16 provides positive cone interface 15 clamping action of the thimbles 11. The short preload loops assure a positive and low interface resistivity even under the bending moment influence from external cable deflections and movements.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A rotary powered transfer apparatus of the type having a plurality of roll ring flexures for transferring power between an inner and an outer circular ring comprising:

a first connecting thimble coupled to a first external power cable at a first end, a second end of said first connecting thimble having a recessed seat, tab integral with said outer ring at one end and surrounding a first terminal at an opposite end, said first terminal shaped to fit within said connecting thimble recessed seat, first clamping means for holding said first connecting thimble and said first terminal in intimate contact, stiffening bolt and backing ring for holding said first terminal in intimate contact with said tab, tie connection having a spherical end for fitting within a spherical recess in said inner ring, opposite end of said tie connection coupled to a second shaped terminal, locking means for keeping said tie connection spherical end positioned at center of radius of said inner ring spherical recess, a second connecting thimble having a recessed seat at one end for accepting said second terminal and coupled at a second end to a second external power cable, and second clamping means for holding said second connecting thimble and second terminal in intimate contact.

2. A rotary power transfer apparatus according to claim 1 further comprising:
   a wavy spring,
   a split electrical insulator ring,
   a shim,
   said wavy spring positioned between and in contact with outer circumference of said outer ring and inner circumference of said shim, said split electrical insulator being positioned between outer circumference of said shim and outer housing of said rotary power transfer apparatus, said shim thickness being selected to provide said wavy spring pressure for optimum heat transfer from said outer ring to said outer housing.

* * * * *